July 21, 1925.
F. T. BAIRD
1,546,359
MULTICELL BATTERY RECEPTACLE
Filed Jan. 16, 1922   3 Sheets-Sheet 1
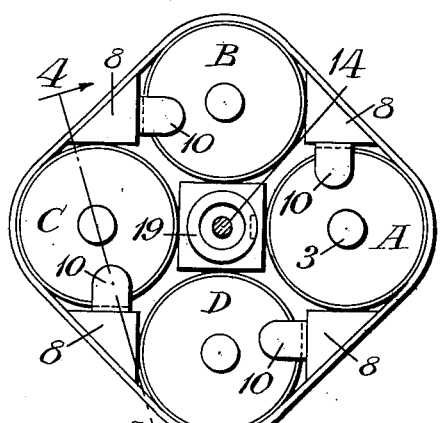
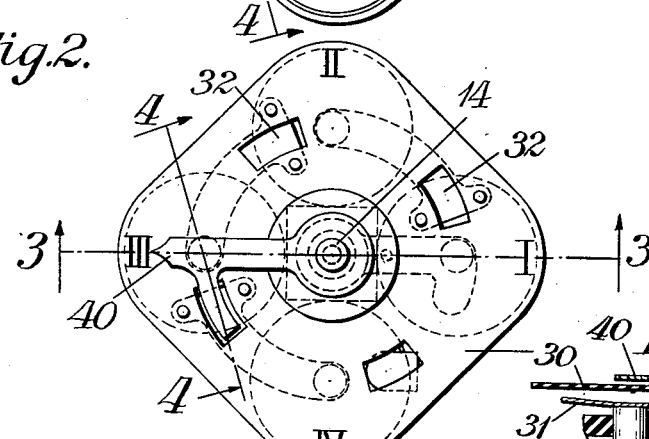
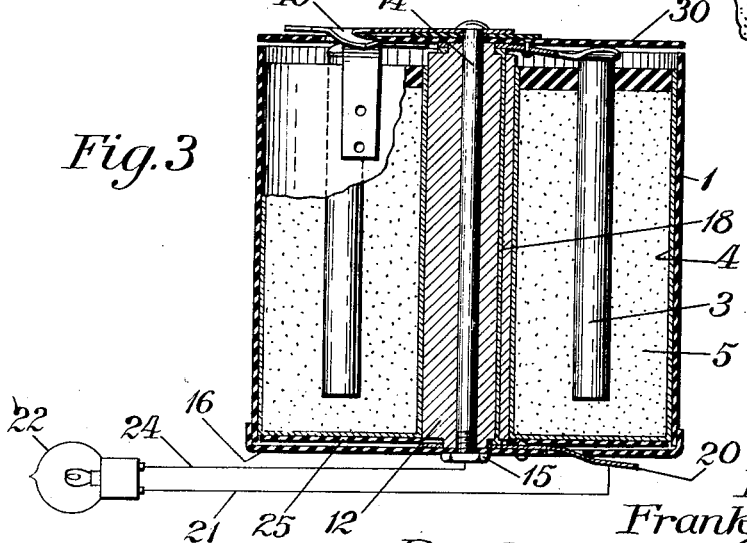
Inventor:
Frank T. Baird
By Cheever & Cox Attys.

July 21, 1925.

F. T. BAIRD 1,546,359

MULTICELL BATTERY RECEPTACLE

Filed Jan. 16, 1922     3 Sheets-Sheet 2

Inventor:
Frank T. Baird
By Cheever & Cox
Attys.

July 21, 1925.　　　　　　　　　　　　　　　　1,546,359
F. T. BAIRD
MULTICELL BATTERY RECEPTACLE
Filed Jan. 16, 1922　　　　3 Sheets-Sheet 3
Fig. 11. Four One-Cell Connections
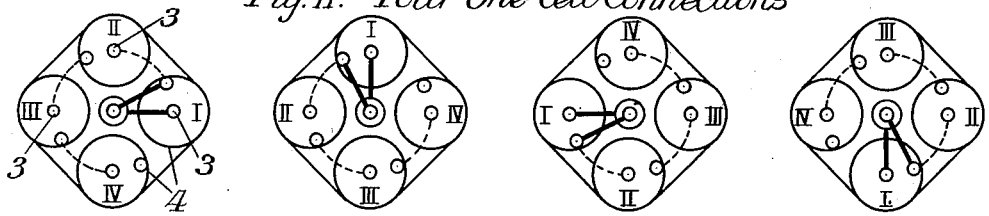
Fig. 12. Four Two-Cell Connections
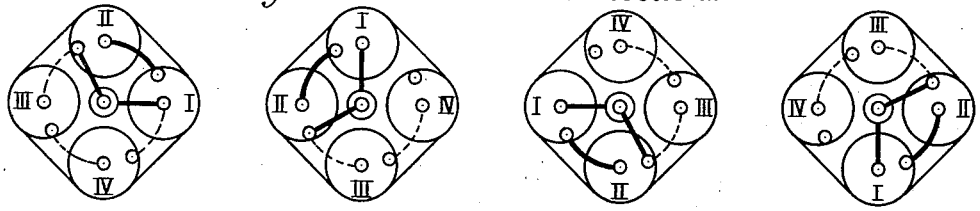
Fig. 13. Four Three-Cell Connections
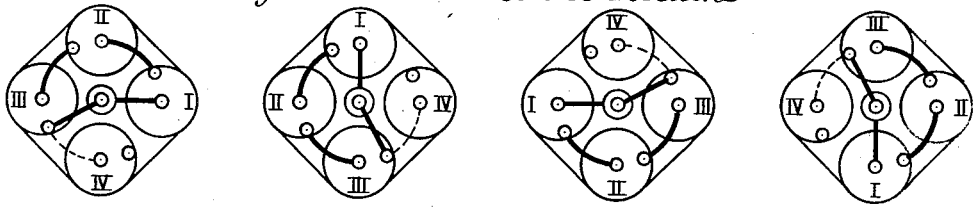
Fig. 14. One Four-Cell Connection
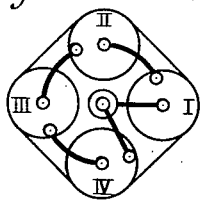
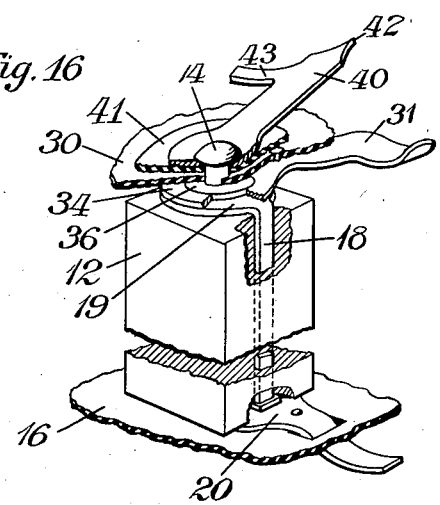
Fig. 15
Fig. 16
Inventor:
Frank T. Baird
By Cheever & Cox
Attys.

Patented July 21, 1925.

1,546,359

UNITED STATES PATENT OFFICE.

FRANK T. BAIRD, OF BLUE ISLAND, ILLINOIS.

MULTICELL-BATTERY RECEPTACLE.

Application filed January 16, 1922. Serial No. 529,595.

*To all whom it may concern:*

Be it known that I, FRANK T. BAIRD, a citizen of the United States, residing at Blue Island, in the county of Cook and State of Illinois, have invented a certain new and useful Improvement in Multicell-Battery Receptacles, of which the following is a specification.

My invention relates to multi-cell battery receptacles and is applicable especially to portable lighting devices, including lanterns for the use of trainmen, miners, and others. In certain cases, for example, in the use of trainmen's lanterns it is important that service be maintained at all times, and under all conditions, and one of the objects of my invention is to provide a construction which will render this possible and practicable. In carrying out my invention I have provided a receptacle capable of containing a plurality of cells and have provided means whereby any individual cell may be put in circuit. If the user finds that the voltage of any given cell is unduly reduced, on account of the de-energization of the cell, he may readily throw such cell out of circuit and substitute another one: one of the objects of my invention is to provide a construction by which this may be readily accomplished. It may sometimes occur that all of the cells are largely, but not entirely, discharged, and one of my objects is to provide means whereby, under such conditions, two or more of the cells may be connected in series to bring the lamp voltage up to the proper figure. Another object of the invention is to provide a construction which will afford the operator a combination of selections so that he may not only increase or decrease the number of cells in circuit at any time, but be able to select the particular cells to be put in circuit. Still another object of the invention is to provide certain mechanical details whereby these groupings and sub-groupings may be readily altered.

I accomplished my objects by the mechanisms illustrated in the accompanying drawings, in which:

Figure 1 is a top view of my battery receptacle showing the cells in place, but the cover removed.

Figure 2 is a top view of the receptacle showing the cover in place.

Figure 3 is a vertical section of the cover, receptacle and batteries upon a plane indicated by the line 3—3 Figure 2.

Figure 4 is a sectional detail on the line 4—4 Figure 2.

Figure 5:
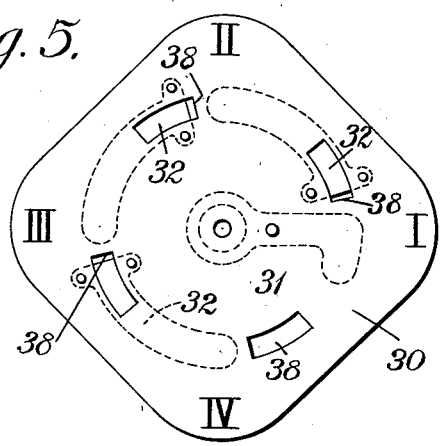
Figure 5 is a top view of the cover stripped of the parts which normally overlie it.
Figure 6:
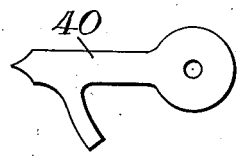
Figure 6 is a top view of the rotatable, or angularly adjustable, service terminal.

Figures 11 to 14, inclusive, are diagrammatic views showing different combinations in groupings of the cells. In Figure 11 there are shown four different one-cell connections. In Figure 12 there are shown four different two-cell connections. In Figure 13 there are shown four different three-cell connections; and in Figure 14 there is shown a four-cell connection.

Figure 15 is a perspective view of the removable bottom member of the receptacle.

Figure 16 is a fragmentary perspective of the connections of the service terminals.

Like numerals denote like parts throughout the several views.

In the form selected to illustrate the invention the receptacle 1 is adapted to hold compactly and symmetrically grouped about a common center four cells A, B, C and D. These particular cells are of the cylindrical zinc, carbon type although the principle of the invention is applicable to cells of other types and configurations. As best shown in Figures 3 and 4 the individual cells have carbon centers 3, and zinc shells 4 separated by any suitable form of electrolyte 5. At the middle of the four sides of the receptacle are blocks 8 of wood or other insulating material to which are permanently fastened conductive clips 10 which have horizontal, inturned tops and also engage the sides of the shells as best shown in Figure 4.

At the center of the receptacle is a core 12 of wood or other insulating material. This is centrally apertured to accommodate a stud 14 of conductive material. This stud has a nut 15 on the bottom adapted to hold in place the bottom 16 of the receptacle as best shown in Figure 3. The core is longitudinally apertured also to accommodate a metallic strip 18 which has a ring 19 at the upper end and at the lower end makes permanent electric contact with a conductive shoe 20. This shoe passes out through a suitable orifice in the bottom 16 as best shown in Figures 3, 15 and 16. Said shoe is designed to contact a ring at the bottom of a lantern for putting the lamp in circuit but as the lantern constitutes no part of my present invention it will be sufficient for the present purpose to illustrate the connections diagrammatically as at the bottom of Figure 3 where it is shown that the shoe 20 is connected by a conductor 21 to one contact of the electric lamp 22 and the other contact of the lamp is connected by a conductor 24 to the stud 14 previously mentioned. In order to insulate the shells 4 of the cells from the shoe 20, an inner plate, or false bottom 25 of fibre or other insulating material is provided within the receptacle as best shown in Figures 3 and 16.

Now referring to the fittings at the top of the receptacle: The cover 30 which is shown stripped of its overlying parts in Figure 5, has permanently fastened to its under-side a single service terminal 31 and three connector strips 32. The service terminal is adapted to make electric contact with the upper end of any one of the carbon electrodes 3 depending upon the position to which the cover is angularly adjusted upon the receptacle. By preference this service terminal is L-shaped, the outer end being upturned, as shown in Figures 3 and 16. The purpose of this is to enable it to ride up over the end of the carbon electrode when the cover is being angularly adjusted. The essential characteristic of this service terminal however is that it makes electric contact with the carbon electrode and puts it in circuit with the ring 19, strip 18 and shoe 20, as shown in perspective in Figure 16. As there illustrated the inner end of the terminal terminates in a ring 34 which makes close contact with the ring 19 and is insulated from the stud 14 by an insulating washer 36.

The connector strips 32 previously mentioned are arcuate and extend approximately through a quadrant of the cover, the ends being located beneath apertures 38 formed in the cover and extending to and being adapted to make contact with the tops of the carbon electrodes in the cells not engaged by the service terminal 31.

The strips overlie and electrically engage the clips 10 and hence operate to connect the zinc shell of one cell with the central, carbon electrode of the adjacent shell. This is well illustrated in Figure 4. It is desirable to distinguish the four corners of the cover and for this purpose I have marked them I, II, III, IV, as shown in Figures 2 and 5. The fixed service terminal points toward corner I, while the connector strips are arranged in series in a counter-clockwise direction. There is no connector strip directly connecting corner IV with corner I. Consequently the cell under corner IV can be connected with the cell under corner I only by connecting it in series through the cells under corners III and II.

Mounted on the top of the cover is a second service terminal 40, the inner end whereof overlies an insulating washer 41 lying on top of the cover, said terminal is apertured to make electric contact with the head of the stud 14, and is rotatable relatively to the cover about the stud as an axis. This rotatable, or movable, service terminal has a pointer 42 at the end and a laterally projecting foot 43 which extends obliquely downward so as to pass down through an aperture 38 and make direct electric contact with the connector strip 32 beneath.

As indicated, the parts are so constructed that the cover may be placed in any one of four positions on the receptacle. The fixed terminal 31 is fastened to it and hence will engage the center carbon of any one of the four cells, depending on the position to which the cover is adjusted.

The rotatable terminal 40 may be angularly shifted about the stud 14 as an axis to any one of four positions, relatively to the cover. The greater the angular distance (counterclockwise) between the fixed service terminal 31 and the rotatable service terminal 40 the greater will be the number of cells in circuit.

While the manner of assembling and constructing the parts may be varied it will be observed that in the present case the cells are inserted or removed through the bottom of the receptacle. On such occasions the receptacle is turned upside down, the nut 15 is unscrewed from the stud and the bottom 16 and insulating plate 25 lifted off. The cells may then be lifted out of the receptacle and fresh ones substituted.

*Operation.*—As previously stated my device affords a choice, not only as to what individual cells shall be in circuit, but also as to how many cells shall be in circuit. Let us first trace the circuit for a single cell: Let it be assumed that the corner I of the cover is over the battery A as shown in the diagram at the left end of the group in Figure 11. The service terminals 31, 40 will be put in the relative positions shown in Figure 7. From the central electrode 3 of cell A the current will pass through the fixed terminal 31, thence to the ring 19 and strip 18, thence to the shoe 20, conductor 21, lamp 22, conductor 24, stud 14, movable terminal 40, underlying connector strip 32, engaged clip 10, and shell of cell A. The circuit is then completed through the electrolyte of cell A to electrode 3. It will be obvious that by leaving the service terminals 31, 40, in the same positions relatively to the cover but rotating the cover to different positions on the receptacle, any one of the other cells B, C or D may be similarly put in circuit. There will, of course, be only one cell in circuit at a time.

Figure 7:
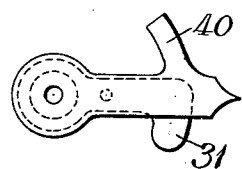
Figure 7 is a top view of the rotatable and fixed service terminals, showing them in the position which will put a single cell in circuit.
Figure 8:
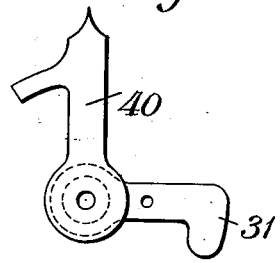
Figures 8, 9 and 10 are similar to Figure 7, but show changed positions of the rotatable service terminal such as to put two, three and four cells in circuit, respectively.

If it is desired to put two cells in circuit, in series, the movable service terminal 40 will be rotated from the position shown in Figure 7 to the one shown in Figure 8. If three cells are desired, the said terminal will be rotated to the position shown in Figure 9, and if four are wanted it will be rotated to the position shown in Figure 10. To trace the circuit with two cells in circuit, in series: Let it be assumed that corner I of the cover is over cell A as in Figures 2 and 5. The service terminals will occupy the relative positions shown in Figure 8. The parts will now correspond to the diagram at the left end of the series shown in Figure 12 of the drawings. From the central electrode 3 of cell A the current will pass through the fixed terminal 31, thence to the ring 19 and strip 18, thence to the shoe 20, conductor 21, lamp 22, conductor 24, stud 14, movable terminal 40, underlying strip 32 (occurring between the numerals II and III Figures 2 and 5), thence to the underlying clip 10, thence to the zinc shell of cell B, thence through the electrolyte and carbon electrode to the connector strip 32 occurring between the numerals 1 and 11 of the cover. From this connector strip the current passes to the underlying clip 10, thence to the zinc shell of cell A, thence through the electrolyte back to the central electrode 3 of cell A. This puts cells A and B in circuit. If it is desired to put cells B and C in circuit, the cover is rotated a further 90 degrees counterclockwise, whereupon the situation corresponds to the one shown in the next diagram to the left end of Figure 12. Another 90 degree rotation of the cover counterclockwise will put cells C and D in circuit and another 90 degrees will put cells D and A in circuit. The latter condition is shown at the right end diagram Figure 12.

Figure 9:
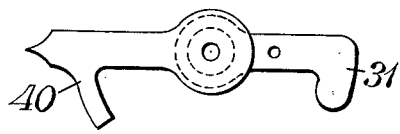

If it is desired to put three cells in circuit the movable service terminal will be rotated on the cover to the position shown in Figures 2 and 9. This gives a three-cell connection and the four possible groupings are illustrated in the four diagrams, Figure 13 of the drawings.

Figure 10:
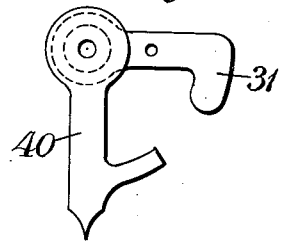

If a four-cell connection is desired, the movable terminal is rotated an additional 90 degrees counterclockwise until the parts assume the relative position shown in Figure 10. The connections are then shown diagrammatically in Figure 14.

It will be noted that the fixed terminal 31 points toward the Roman numeral I and that the rotatable terminal 40 has a pointer so located on it that when the pointer points to numeral 1 (which corresponds to Arabic numeral 1) a one-cell connection will result, regardless of the position of the cover on the receptacle. Similarly, when the pointer points to II, a two-cell connection will result; when the pointer points toward III, a three-cell connection will result, and when the pointer points to IV a four-cell connection will result. This enables the operator to determine at a glance how many cells are in circuit.

From the foregoing it will be evident that the number of cells in circuit at any time is controlled by rotatable service terminal 40 in its position relatively to the fixed terminal 31. The particular cells in circuit are controlled by rotating the cover on the receptacle. Consequently by making either one or two simple manipulations a great many combinations and sub-combinations of groupings of the cells are possible.

Having thus described my invention, what I claim as new and desire to secure by Letters Patent is:

1. A battery receptacle adapted to hold bi-polar galvanic cells symmetrically grouped about a common center, a pair of service terminals, one of said terminals being adapted to engage the positive and the other the negative poles of the cells, said service terminals being supported by the receptacle and being angularly adjustable about the center of the receptacle whereby the service terminals may be brought into contact with the poles of any one of the cells for putting it in circuit.

2. A battery receptacle adapted to hold bi-polar galvanic cells symmetrically grouped about a common center, a cover for the receptacle, and two service terminals on said cover, one of said terminals being adapted to engage the positive and the other adapted to engage the negative pole of any individual cell, and the cover being angularly adjustable whereby the service terminals may be brought into contact with the poles of any one of the cells for putting it in circuit.

3. A battery receptacle adapted to hold galvanic cells symmetrically grouped about a common center, and a pair of service terminals carried by said battery receptacle extending into the paths of the poles of said cells, one of said terminals being angularly adjustable with reference to the other, whereby a varied number of cells may be included in the circuit.

4. A battery receptacle adapted to hold galvanic cells symmetrically grouped about a common center, a pair of service terminals carried by said receptacle extending into the paths of the poles of said cells, both of said terminals being angularly adjustable with reference to the receptacle and one of said service terminals being also angularly adjustable with reference to the other service terminal to thereby afford a choice both as to what cells shall be in circuit and the number of cells that shall be in circuit.

5. A battery receptacle adapted to hold cells symmetrically grouped about a common center, a cover for the receptacle, and two service terminals on said cover extending into the paths of the poles of said cells, one of said terminals being fastened to the cover and the other mounted on it but rotatable about the center of grouping as an axis, the said cover being angularly adjustable about the center of grouping as an axis, whereby a choice is afforded both as to what cells shall be in circuit and the number of cells that shall be in circuit.

In witness whereof, I have hereunto subscribed my name.

FRANK T. BAIRD.